Feb. 15, 1966

C. D. PETERSON 3,235,019

DRIVE MECHANISM FOR TRACK-LAYING TRACTOR

Filed April 22, 1963

Inventor:
Clifford Dean Peterson
By Bair, Freeman & Molinare
Attys.

Feb. 15, 1966  C. D. PETERSON  3,235,019
DRIVE MECHANISM FOR TRACK-LAYING TRACTOR
Filed April 22, 1963  5 Sheets-Sheet 2
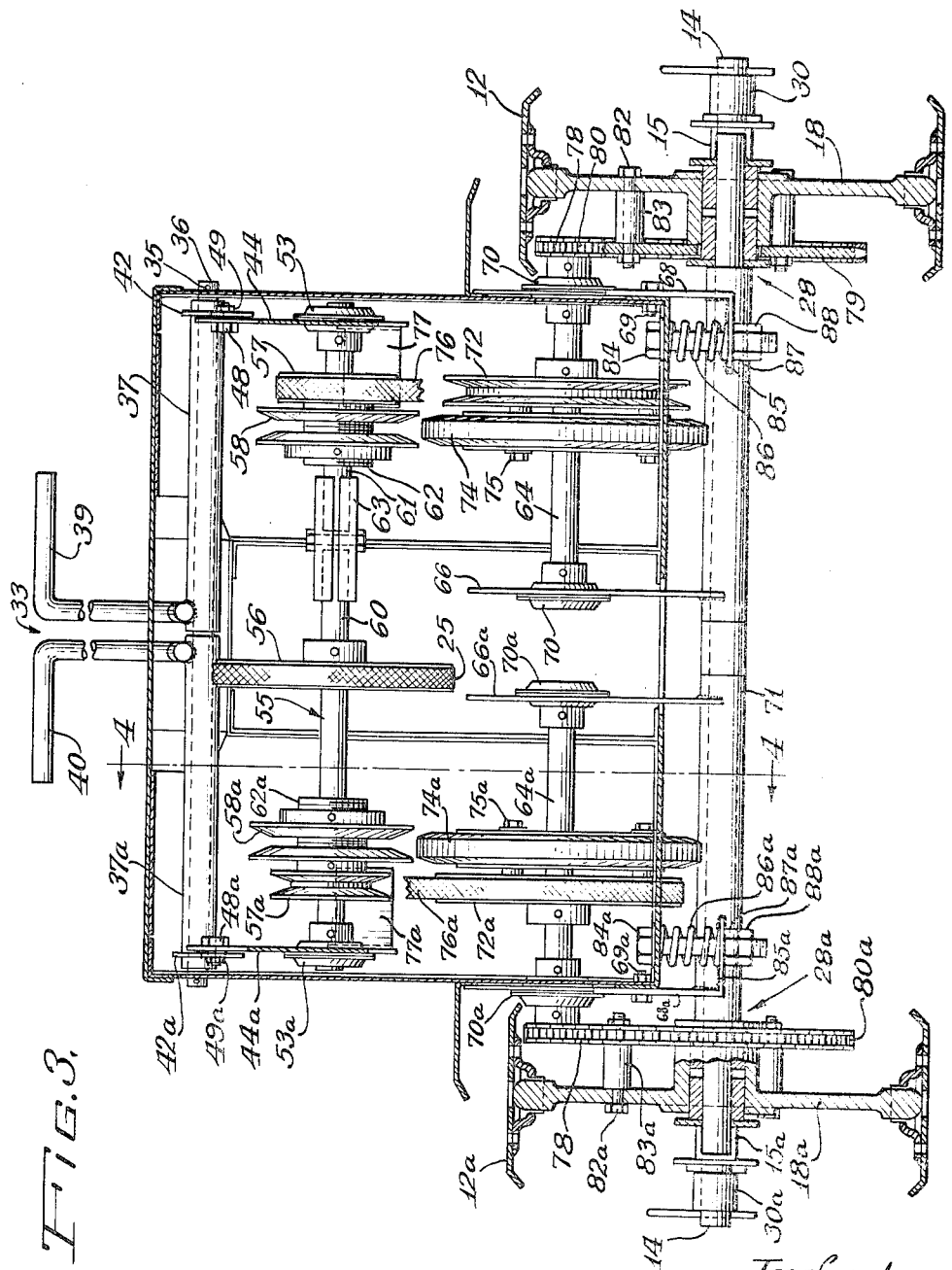
Inventor:
Clifford Dean Peterson
By Bair, Freeman & Molinare
Attys.

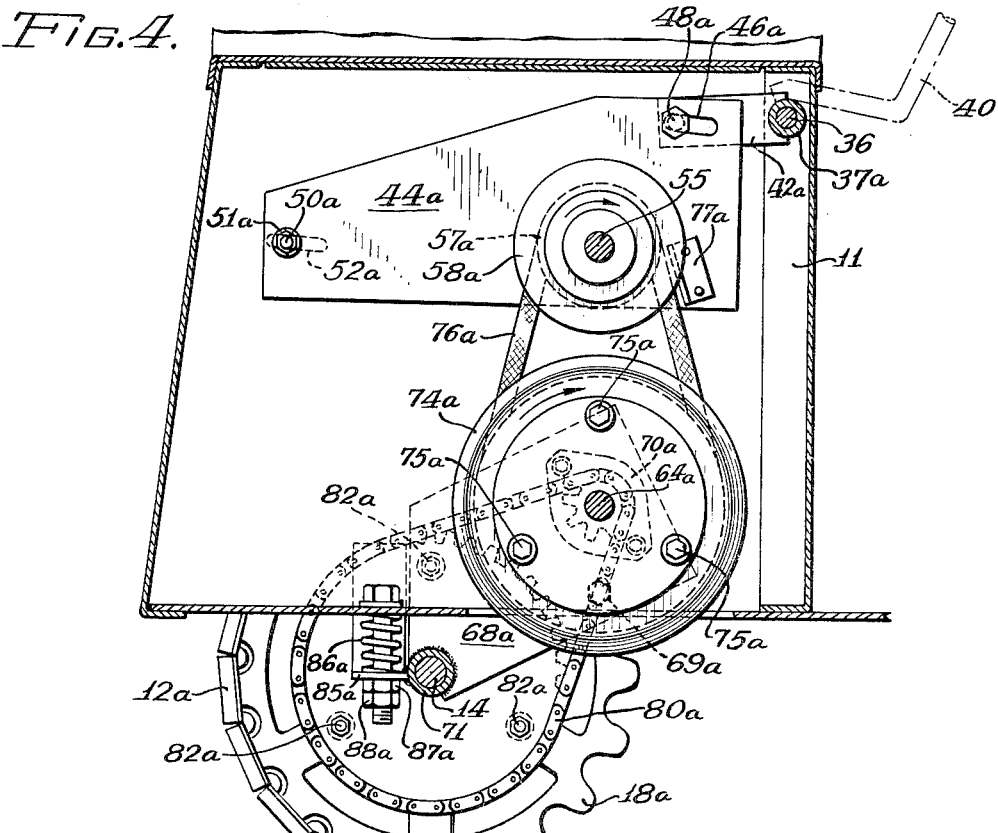
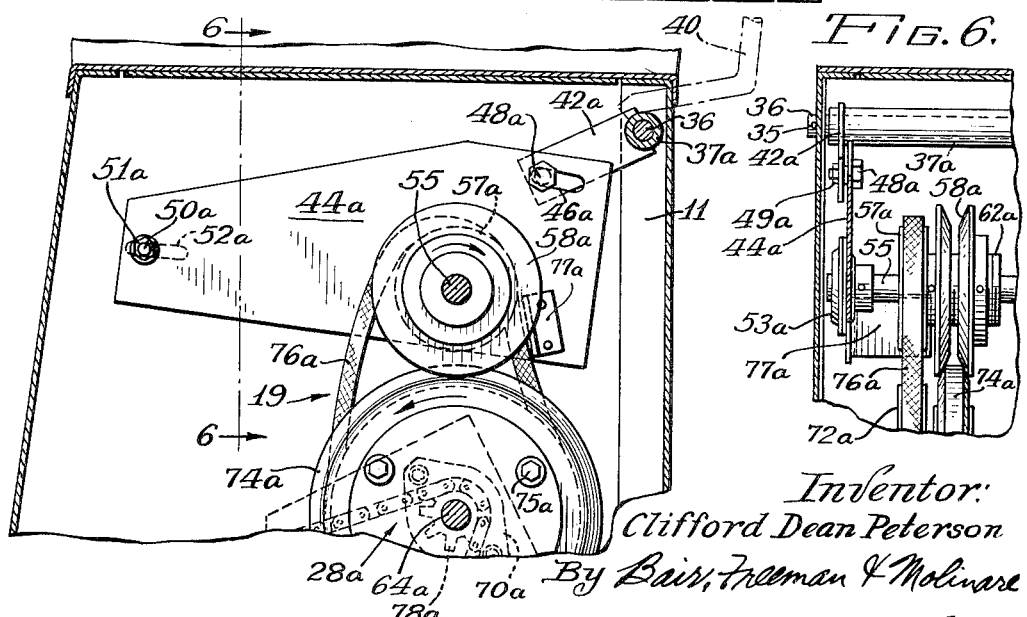
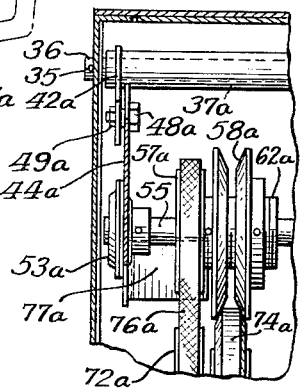

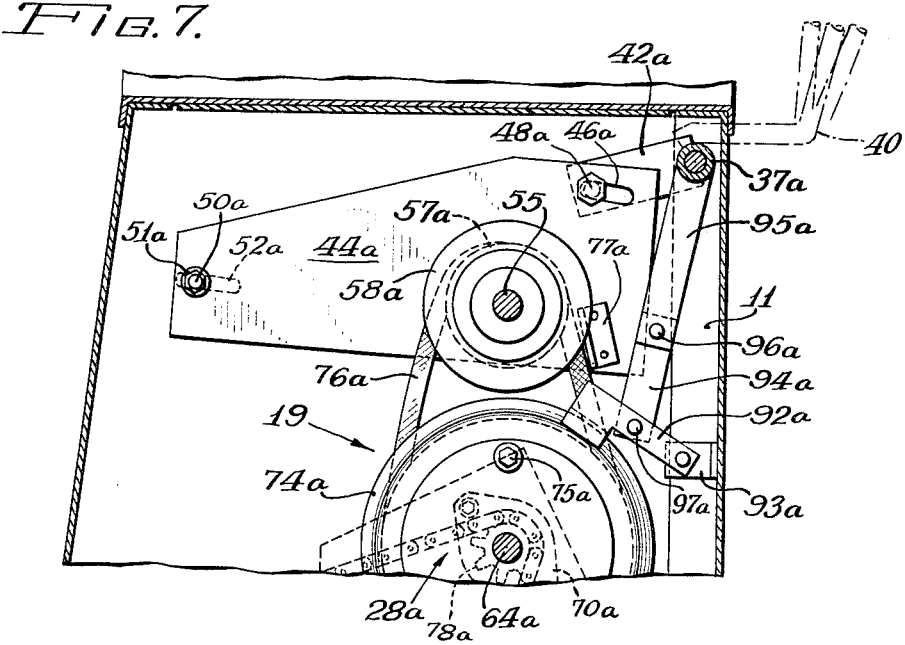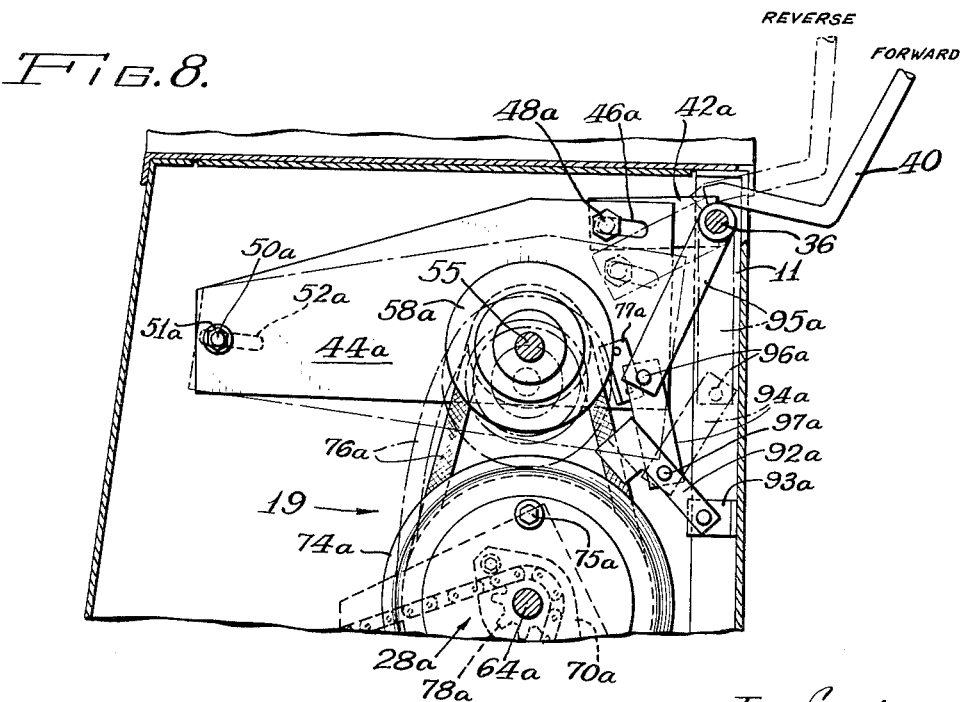

Feb. 15, 1966　　　C. D. PETERSON　　　3,235,019
DRIVE MECHANISM FOR TRACK-LAYING TRACTOR
Filed April 22, 1963　　　　　　　　　　　　5 Sheets-Sheet 5
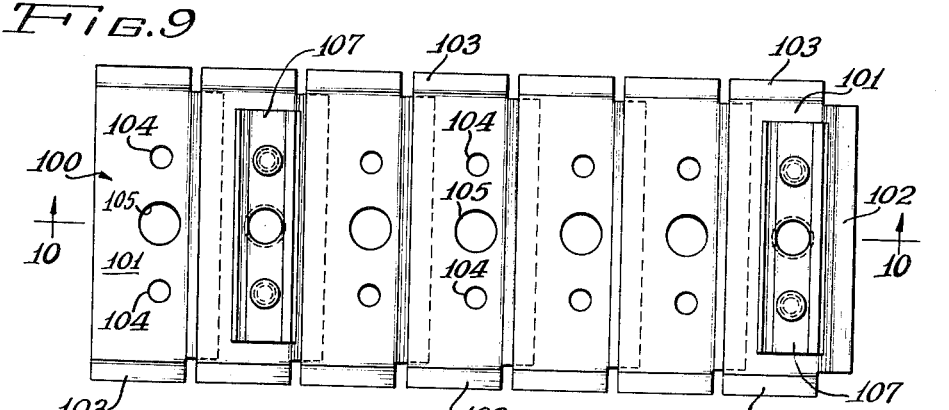
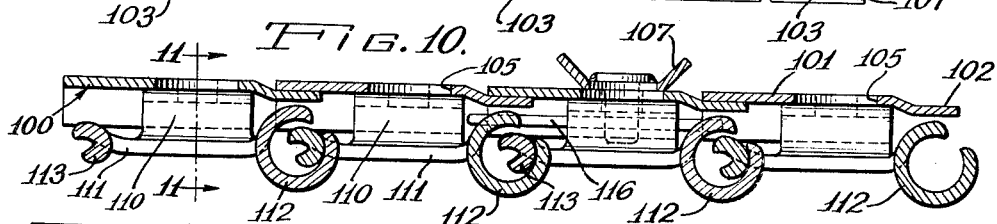
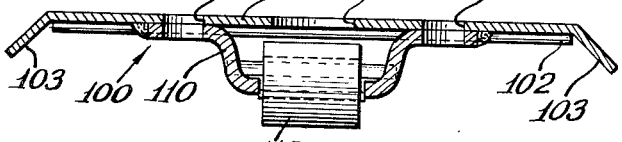
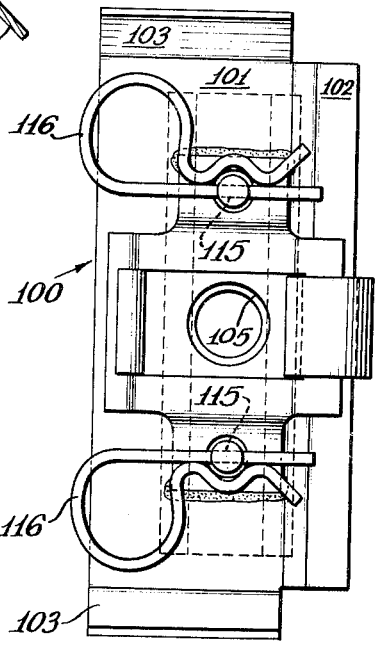
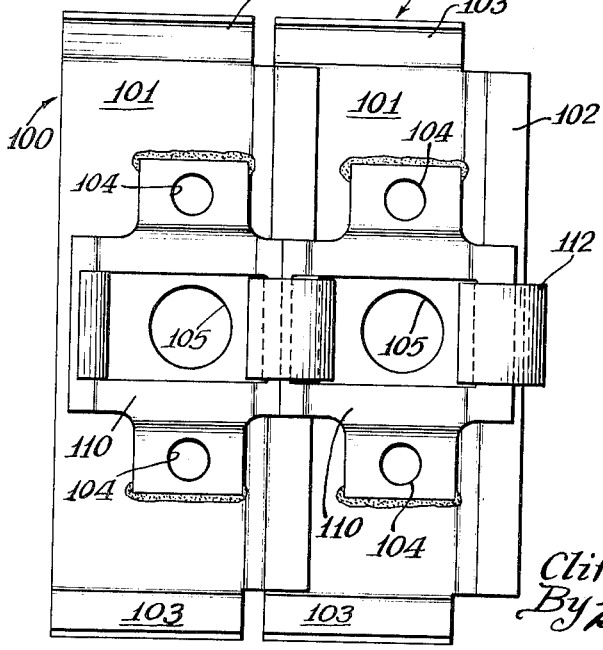
Inventor:
Clifford Dean Peterson
By Bair, Freeman & Molinare
Attys.

United States Patent Office 3,235,019
Patented Feb. 15, 1966

3,235,019
DRIVE MECHANISM FOR TRACK-LAYING TRACTOR
Clifford Dean Peterson, 505 Edgeland Drive, Marshalltown, Iowa
Filed Apr. 22, 1963, Ser. No. 274,729
6 Claims. (Cl. 180—6.66)

This invention relates to a track-laying tractor and more particularly, to an improved drive arrangement for each track.

In the past track-laying tractors have been driven from single belt-forward and friction wheel-reverse transmission arrangements operatively connected to a rear track wheel. The track wheel was usually secured on the rear axle member, which in turn was rigidly connected to the tractor frame. Rigid connection of the rear axle member to the tractor frame tended to cause a hard ride. Further such prior transmissions tended to be complicated and bulky and were difficult to maintain.

An important object of the present invention is to provide an improved drive arrangement for a track-laying tractor.

Another object of this invention is to provide a drive arrangement for a track-laying tractor having two belt-forward and friction wheel-reverse drives in combination with a single tilting drive shaft to achieve forward, reverse, and steering control of the track-laying tractor.

A further object of the present invention is to provide a track-laying tractor having a drive mechanism incorporating a safety brake therein.

Further objects and advantages of this invention will become apparent as the following description proceeds, and the features of novelty which characterize this invention will be pointed out with particularity in the claims annexed to and forming part of this specification.

A preferred embodiment of this invention is shown in the accompanying drawings, in which:

FIGURE 3 is a transverse cross-sectional view of the track-laying tractor taken generally along line 3—3 of FIGURE 2 and more clearly illustrating the drive mechanism therefor;

FIGURE 4 is a detail sectional view of the drive mechanism for the track-laying tractor taken generally along line 4—4 of FIGURE 3 and illustrating the belt-forward drive means in the engaged drive position;

FIGURE 5 is a detail sectional view similar to FIGURE 4 illustrating the friction reverse drive means in engagement;

FIGURE 6 is a detail sectional view taken along line 6—6 of FIGURE 5 and more clearly illustrating the interengagement of the friction reverse drive means;

FIGURE 7 is a cross-sectional view of a modified drive mechanism for the track-laying tractor illustrating an overcenter brake arrangement therefor in the operative position;

FIGURE 8 is a cross-sectional view of the modified drive mechanism of FIGURE 7 illustrating the positions of the overcenter brake arrangement when the control positions of the means are in the forward and reverse positions;

FIGURE 9 is a bottom view of a portion of a track utilized on the track-laying tractor of the present invention;

FIGURE 10 is a cross-sectional view taken along line 10—10 of FIGURE 9 and illustrating the manner of connecting one track pad to an adjacent track pad;

FIGURE 11 is a cross-sectional view of a track pad taken generally along line 11—11 of FIGURE 10;

FIGURE 12 is a top view on an enlarged scale of two adjacent track pads of the present invention; and FIGURE 13 is a top view of a single track pad illustrating the novel manner of connecting ancillary traction means to a track pad.

Figure 1:
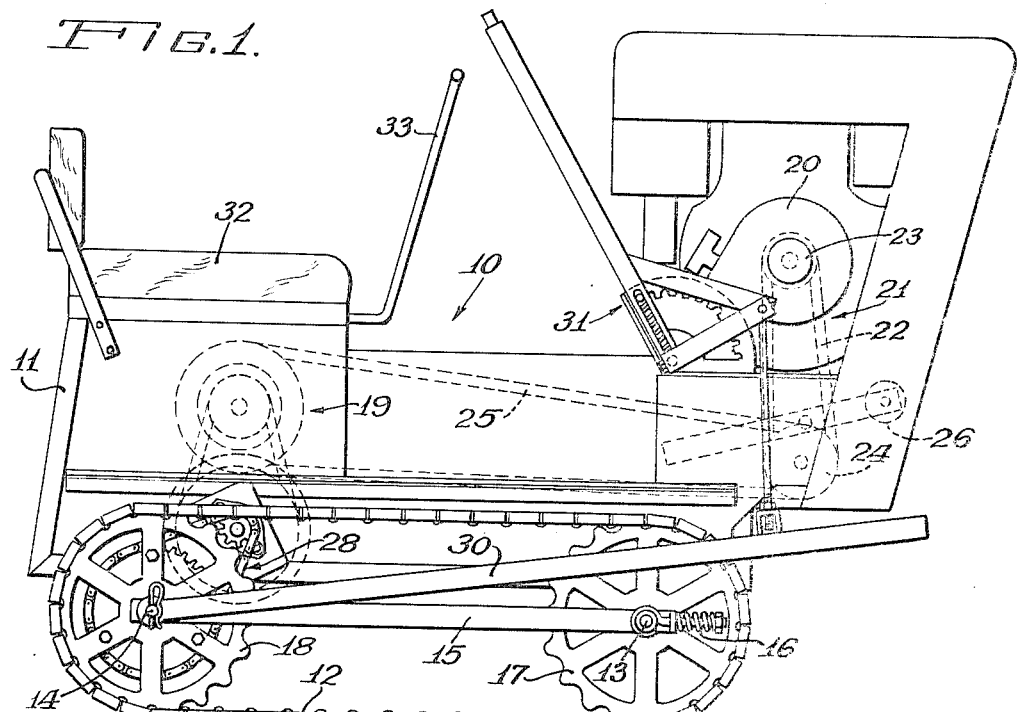
FIGURE 1 is a side view of a track-laying tractor embodying the present invention.

Referring now to FIGURE 1, there is illustrated a track-laying tractor 10 embodying the present invention. The tractor comprises a suitable frame structure 11 movably supported for movement over the ground by a pair of tracks. The track 12 is suitably mounted on front and rear track wheels 17 and 18, respectively, which are suitably affixed on front axle means 13 and rear axle means 14. The axle means are connected by a tie bar 15, which, at the forward end, has resilient means 16 for urging the front and rear axles away from one another to maintain tension on the track 12.

In the illustrated embodiment of the present invention, the rear track wheel 18 is driven from the drive mechanism 19 by suitable chain and sprocket drive means 28. The drive mechanism 19 which comprises an important feature of the present invention, is in turn suitably connected to the motor 20 of the tractor by power take-off means 21 and drive belt means 25, which are operatively connected to the power take-off means 21. The power take-off means 21 may comprise a suitable output pulley 23 on the motor shaft operatively connected by belt 22 to a driven pulley 24 mounted therebelow on the frame structure.

Disposed at the forward end of the tractor is a driven pulley 26 which may be selectively operable to drive attachments which may be affixed on the forward end of the tractor, including a blower, a grass cutter, etc.

These attachments, which may include for example, a snow blower or a rotary grass cutter, may be carried on an implement lift bar 30 which is pivotally connected on the rear axle means 14 and adapted to be raised and lowered by a suitable lift means 31 including a handle operatively engaging a rack sector.

The tractor operator may be seated on seat 32 in position to readily manipulate lift means 31 and the controls 33 which are operatively connected to the drive mechanism 19 as will be more clearly explained hereinafter. It will be understood that the tractor will be provided with conventional motor starting means readily accessible to the operator from seat 32.

Figure 2:
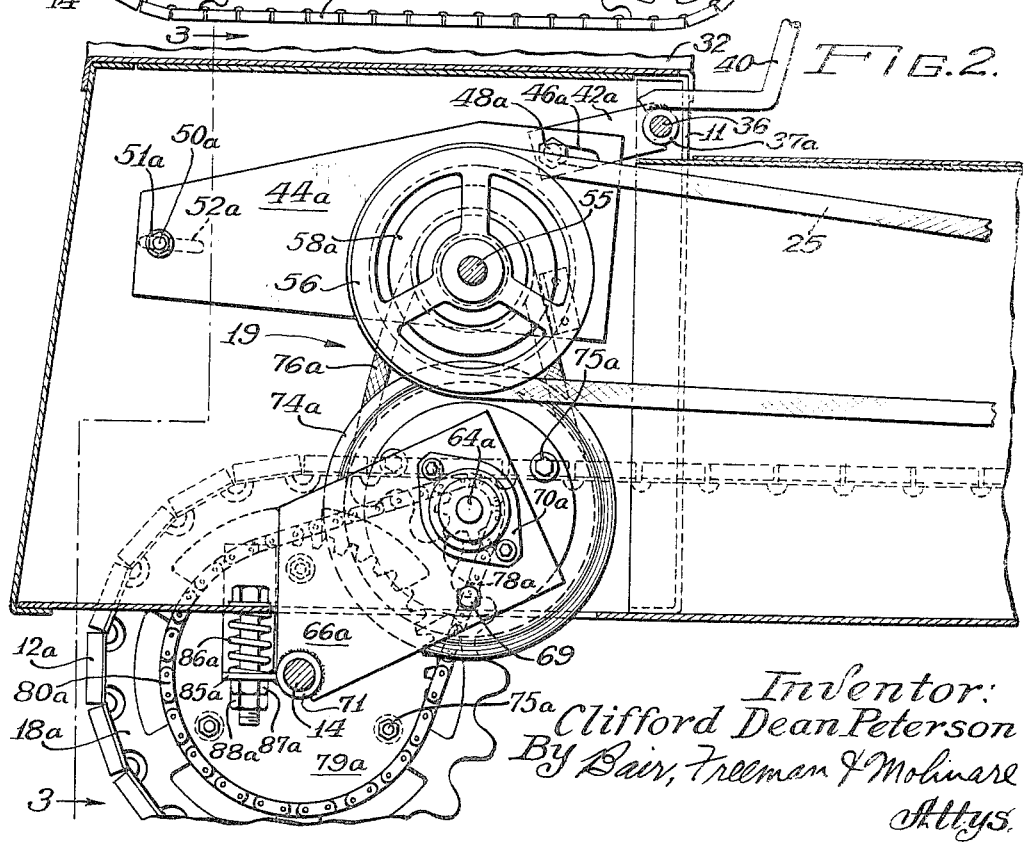
FIGURE 2 is a longitudinal cross-sectional view of the track-laying tractor of FIGURE 1 on an enlarged scale and illustrating a portion of the drive mechanism therefor.

Turning now to FIGURES 2 and 3, it is seen that supported on the frame structure 11 adjacent the seat 32 is a support bar or member 36 which is disposed transversely of the longitudinal axis of the tractor. A suitable cotter pin 35 may extend through a bore provided at each end of the bar member 36 for affixing the bar member 36 in position on the frame structure 11.

Rotatably supported on the support member 36 are a pair of sleeves 37, 37a which are coaxially aligned with one another.

The control means 33 comprise a pair of separate control arms 39 and 40 connected to the inner ends of the sleeves 37 and 37a, respectively.

Rigidly connected to the outer ends of the sleeves 37 and 37a are short lever arms 42 and 42a. It will be understood that the components bearing identical numbers are the same—the subscript $a$ being used to designate those components located on the left side of the tractor. The lever arm 42a is operatively connected to bracket 44a by lost motion means which comprise a slot 46a in the bracket 44a and a bolt 48a and a nut 49a which extend through the slot 46a and respective openings in the lever arm 42a and bracket 44a for connecting the members to one another.

As its rear end bracket 44a is pivotally supported on the frame structure 11 by suitable pivot means defined by bolt 50a and nut 51a. Slot 52a may be provided in the bracket 44a for initial adjustment of the bracket within the frame structure 11.

Rotatably supported in bearings 53, 53a which are affixed on the brackets 44, 44a is a shaft member 55. Power for rotating the shaft 55 is transmitted from the motor 20 via belt means 25 to a pulley 56, which is rigidly connected to the shaft 55. It is to be noted that the shaft 55 is comprised of a pair of the shorter shaft segments 60 and 61 suitably affixed to one another by connecting means 63. Also provided on the shaft means 55 are a pair of first drive means 57, 57a and a pair of second drive means 58, 58a.

Each of the drive means on shaft 55 is adapted to be operatively engaged with driven means supported on coaxially disposed stub shafts 64, 64a. The stub shaft 64 is journalled in bearings 70 which are secured to the plate members 66 and 68, respectively. The bracket member 66 carries bearing 70 adjacent one end thereof and is secured at its lower end to the housing 71 of the rear axle means 14. The bracket 68 carries bearing 70 adjacent one end thereof, is pivoted intermediate its ends on the pivot bolt 69 affixed to the frame member 11, and is secured at its lower outer end to the housing 71 of rear axle means 14.

Secured on the stub shaft 64 in longitudinal alignment with the drive members 57 and 58 are driven members 72 and 74, respectively. The drive member 57 and the driven member 72 each comprise pulleys which are adapted to be connected by a belt 76.

The adjustable drive pulley 58, mounted on threaded sleeve 62 affixed on shaft 55, is adapted to frictionally engage the outer periphery of the friction wheel 74. The driven wheel 74, which is preferably fabricated from a reinforced rubber material and formed to provide maximum surface contact with pulley 58 is operatively connected to the pulley 72 by suitable fastening means 75. As the pulley 72 is affixed to the drive shaft by suitable connecting means, it will be apparent that when either the friction wheel 74 or the pulley 72 is rotated, the stub shaft 64 will also be rotated. Belt guide 77 is provided to retain the belt 76 when the forward drive is inoperative.

Affixed on the outer end of the stub shaft 64 is a sprocket 78 which will be rotated upon rotation of the stub shaft. The sprocket 78 is operatively connected with a sprocket 79 journalled on the rear axle means by a chain 80. As the sprocket 79 is operatively connected to the adjacent track wheel 18 by suitable fastening 82, it will be apparent that upon rotation of stub shaft 64, track 18 will be driven via drive means 28. The operation of the drive mechanism 19 which comprises an important feature of this invention will be described fully hereafter.

Another important aspect of the present invention is the method by which the rear axle means 14 is suspended from frame structure 11. By the novel design, the rear axle is sprung for an improved ride without causing slack in the final drive means 28 or transmitting shock loads through to the hand control levers 39 and 40 of the control means 33.

As seen in FIGURES 2 and 3, the lower end of each bracket 68 is provided with an inwardly turned portion 85. Bolt 84 extends through the frame structure 11 and the portion 85 of the bracket 68. Concentrically supported on the bolt 84 between the frame structure 11 and the portion 85 of the bracket 68 is coil spring 86. The biasing force of spring 86 may be adjusted by rotating adjustment nut 87 with respect to the bolt 84. Lock nut 88 may be rotated to fix adjustment nut 87 in position.

In FIGURES 2 and 3, the drive mechanism was illustrated in the neutral position, that is, a position wherein neither the first drive means nor the second drive means are engaged with the respective driven members. In such case, the shaft 55 may be rotated but no power is transmitted to either of the stub shafts 64 or 64a.

In FIGURE 4, there is illustrated a detail view of drive mechanism 19 taken generally along line 4—4 of FIGURE 3, wherein the control handle 40 has been moved forwardly or clockwise, as viewed in FIGURE 4, so as to pivot the bracket 44a, counterclockwise about the pivot pin 50a. In this position the friction-engaging members 58a and 74a are separated from one another and the pulleys 57a and 72a are spaced apart so as to tension belt 76 and thus operatively engage the rotatable driven shaft 55 with stub shaft 64a. Power will be transmitted from the stub shaft 64a through the final drive means 28a to the left track 12a to drive the track forward.

It will be appreciated that when the handle 39 is similarly moved forward, the drive pulley 57 will be operatively connected with the driven pulley 72 on stub shaft 64 to rotate the stub shaft and actuate final drive means 28 for driving the right track 12. Clockwise rotation would be transmitted from the shaft 55 to the rear axle means 14 and thus when the first drive means are operative, the tractor will be moved forwardly.

Considering now FIGURES 5 and 6, there is illustrated the position of a portion of the drive mechanism when the control handle 40 is moved counterclockwise or rearwardly. In this instance, the bracket 44a will be pivoted clockwise about pivot 50a causing the belt 76a to be disengaged and causing the adjustable drive pulley 58a to be operatively engaged with the flexible driven wheel 74a. Stub shaft 64a will be caused to rotate in a reverse direction and this reverse rotation will be imparted to the track 12a by means of the final drive 28a.

From the foregoing, it is evident that if both control levers 39 and 40 are moved forwardly, the tractor 10 will be moved in a forward direction, whereas if both control levers are moved rearwardly the direction of rotation will be reversed. The tractor 10 may be steered by actuating one or the other of the control levers 39 40 of the control means 33. For example, to drive the tractor to the right, control lever 39 may be retained in the inoperative neutral position so as to hold track 12 immobile and the control lever 40 may be moved forwardly so as to drive the track 12a. In a similar manner, by retaining lever 40 in the inoperative neutral position and actuating lever 39 forwardly, track 12a may be held inoperative and track 12 may be actuated to cause the tractor to turn to the left.

Referring now to FIGURES 7 and 8, there is illustrated a modification of the drive mechanism for the track-laying tractor, wherein an optional transmission brake arrangement is provided for safety when the tractor is idle and for reducing wear upon the friction-engaging members. Pivotally mounted on the bracket 93a affixed to frame structure 11 is a lever arm 92a, which is adapted to engage the friction wheel 74a. A connecting link 94a is pivotally connected at one end to lever arm 92a by pin 97a and at the other end is pivotally connected to a link arm 95a by pivot pin 96a. The link arm 95a is, in turn, connected rigidly to the sleeve 37a for movement therewith. The components are illustrated in the operative braking position in FIGURE 7 with lever arm 92a in holding engagement with friction wheel. This construction not only provides a safety and parking brake for the track-laying tractor but also provides a means for allowing turning without slipping one of the reverse friction wheels.

FIGURE 8, the brake linkage is illustrated in the inoperative position, that is when the control handle 40 is in either the forward or the reverse position. It is seen that in each of these positions indicated in solid and dotted lines respectively, the lever arm 92a is pivoted upwardly away from the friction drive wheel 74a so as to permit free movement of the friction wheel 74a. It will be seen that in steering operation there will be no need for the friction members 58a, 74a to bear upon one another and tend to move with respect to one another so as to cause undue wear upon the friction members 74a and 58a. It will be appreciated that to prolong the life of the friction drive members, it is necessary that the drive members be utilized only in the reverse drive operation. When the over-center brake arrangement illustrated in FIGURES 7 and 8 is used, there will be no undue wear between the friction drive members, that is, the friction wheel 74a will be held in fixed position by means of the hold lever 92 and thus there will be a prolongation of the life of the friction wheel.

Another important feature of this invention is the improved track structure. Considering now FIGURE 9, there is illustrated bottom view of a portion of a track 12. It will be seen that the track comprises a plurality of track pads 100 each having a main portion 101 with upturned ends 103 and an offset portion 102 which is adapted to underlie an adjacent main portion 101. Provided in the central portion 101 of each track pad are a pair of smaller openings 104 and a larger central opening 105.

As is seen more clearly in FIGURES 10, 11 and 12, each track pad 100 is hingedly connected to an adjacent track pad. Rigidly affixed beneath each track pad 100 is a bracket 110 which has a central portion 111 spaced from the central portion of the track pad. Formed from the central portion of the bracket 110 is a hook portion 112 and a retaining portion 113. The hook portion 112 on one track pad is adapted to engage the retaining portion 113 of an adjacent track pad and thus the hook portion and retaining portion of an adjacent track pad define hinge means for permitting pivotal movement of one track pad with respect to the adjacent track pad.

By virtue of the large central hole in the center of each track pad, the chain sprocket teeth on the track wheels on which the track pad is supported will force foreign matter, such as dirt, snow, gravel and the like, from the opening and thus render the track self-cleaning. Without this particular self-cleaning feature, it has been found that under certain applications, particularly when the track-laying tractor is used in snow removal, snow and ice will pack under the pad and compress the track tensioning spring 16 (FIGURE 1) so as to throw the track from the track wheels.

Also illustrated in FIGURES 9, 10 and 13 is a further modification of the track wherein a cleat may be provided on spaced track pads to provide for better traction during winter use of the track-laying tractor. As seen in FIGURE 9, the cleats 107 need not be attached to each pad 100 but may be affixed to space pads, for example, one cleat on every sixth to eighth pad would be adequate. Each cleat 107 is provided with a pair of studs 106 which are rigidly connected to cleat 107 and are adapted to extend through the openings 104 in the main portion 101 of track pad 100. The end of each stud 106 is provided with an opening 115 through which a retaining pin 116 may pass for detachably connecting the cleat 107 to its associated track pad 100.

The overlapping design of the track pads permit a spreading out of the load thus providing less ground compaction and less cutting of the turf by the track during operation. Further, by virtue of this feature of overlapping and interlocking portions of adjacent track pads, shock loads are transmitted and longer track life results. The large hole or opening in the center of each track pad allows the teeth on a track wheel to force out foreign matter and thus provides a self-cleaning track arrangement. It is presently contemplated that the traction cleat will be advantageously used for increasing traction in the winter and will be readily removed for lawn work in the summer when smooth tracks are desired to prevent cutting of the turf.

There has been provided by the present invention a unique drive mechanism for a track-laying tractor. The novel drive mechanism is compact and utilizes separate belt drive arrangements for driving the tractor forward and friction wheel arrangements for reversing the drive to the tracks to drive the tractor rearward.

The friction driven members on the stub shafts are each adapted to be engaged by an adjustable drive pulley, the adjustment of the drive pulley permitting the taking up of wear of the friction wheel during operation.

Another novel aspect of the preset arrangement is the construction wherein the rear axle is resiliently mounted with respect to the frame structure so as to provide for an improved ride without causing slack in the final drive chain linkage 28 or without transmission of shock loads to the hand levers 39 and 40 of control means 33.

While there has been shown a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. Drive mechanism for use with a tractor having a pair of tracks for supporting the tractor for movement over the ground, said drive mechanism comprising a support member adapted to be affixed on frame structure on said tractor and extending transverse to the normal line of movement of the tractor, first axle means secured to said frame structure for driving one of said tracks, said first axle means having first and second driven means thereon, second axle means secured to said frame structure for driving the other of said tracks, said second axle means having third and fourth driven means thereon, a rotatable shaft having first, second, third, and fourth drive means thereon, means movable with respect to said support member for rotatably supporting said rotatable shaft, said first and fourth drive and driven means, respectively, being operatively engaged by flexible belt means for moving the tractor in one direction, said second and third drive and driven means being adapted to be moved into frictional engagement to move the tractor in a reverse direction, and control means for moving said movable means selectively from a neutral position, wherein none of the drive and driven means are operatively engaged to selectively operative positions wherein either one or both of the first and fourth drive and driven means are operatively engaged or, wherein either one or both of the second and third drive means are operatively engaged.

2. Drive mechanism for use with a tractor having a pair of tracks for supporting the tractor for movement over the ground, said drive mechanism comprising a support member adapted to be secured on frame structure on said tractor and extending transverse to the normal line of movement of said tractor, first axle means on said frame structure drivingly connected to one of said tracks, second axle means on said frame structure drivingly connected to the other of said tracks, said axle means being substantially coaxially supported on said frame structure, a rotatable shaft having pairs of drive means thereon, said drive means including first drive means adapted to be selectively frictionally coupled to said first axle means and said second axle means, and a second drive means adapted to be selectively coupled to said first axle means and said second axle means by flexible belt means, movable means journalling said rotatable shaft for movement toward and away from said first and second axle means, said movable means including a pair of sleeve members rotatably carried on said support member, and control means for selectively moving said movable means for operatively engaging said drive means with said axle means to selectively (1) drive both tracks in a forward direction, (2) drive both tracks in a reverse direction, or (3) drive one or the other of said tracks to turn the tractor, said control means comprising a pair of actuating levers operatively joined to said sleeve members for independently actuating a sleeve member to selectively position said rotatable shaft.

3. Drive mechanism for a track-laying tractor having a pair of tracks thereon, said drive mechanism comprising frame structure on said tractor, a support member affixed on said frame structure and extending generally transversely of said tractor, a pair of sleeves journalled on said support member, lever means for independently rotating said sleeves on said support member, first and second brackets each pivotally secured at one end to said frame structure and pivotally affixed at the other end to a sleeve, a rotatable shaft supported on said brackets and extending generally parallel to said support member, means for driving said rotatable shaft in one direction, a pair of first drive pulleys affixed on said rotatable shaft adjacent the ends thereof, a pair of second drive pulleys affixed on said shaft inwardly of said first pulleys, first axle means on said frame structure operatively connected to one track, second axle means of said frame structure operatively connected to said other track, a pair of driven members on said first axle means, a pair of driven members on said second axle means, each of said drive pulleys being in longitudinal alignment with an associated driven member, belt means connecting each of said first pulleys with one of said driven members in alignment therewith, each of said pair of second pulleys being adapted to be moved selectively into frictional engagement with said driven member in alignment therewith, said lever means being selectively movable from neutral position wherein none of the drive and driven members are operatively connected to positions wherein (1) said first pulleys and associated drive members are operatively connected for driving both tracks in one direction, (2) said second pulleys and associated driven members are operatively connected for driving both tracks in a reverse direction, (3) one first pulley or one second pulley is operatively connected to an associated driven member while the other of said first pulley or second pulley is disengaged from its associated driven member for driving one of the tracks while the other is stationary and (4) a first pulley is operatively connected to an associated driven member and a remotely disposed second pulley is operatively connected with its associated driven member for driving one track in said one direction and the other track in said reverse direction.

4. In a track-laying tractor, the combination of frame structure; front axle means on said tractor, rear axle means on said tractor; track means on each side of said tractor operatively connected to the ends of said front and rear axle means; and drive mechanism for actuating said track means, said drive mechanism comprising a support member transversely mounted on said frame structure, first and second sleeve members rotatably carried on said support member, a first bracket pivotally supported at one end adjacent the outer extremity of one sleeve member and pivoted at the other end on said frame structure, a second bracket pivotally supported at one end adjacent the outer extremity of said other sleeve member and pivoted at the other end on said frame structure, a shaft member journalled for rotation in said brackets, means for rotating said shaft member in one direction, first and second pairs of drive members on said shaft member, first and second stub shafts coaxially mounted with respect to one another, first and second driven members on each stub shaft, pairs of support means pivotally mounted on said frame structure and being affixed at one end to said rear axle means and journalling a stub shaft at the other end, spring means for biasing the rear axle means with respect to the frame structure, said first drive and driven members being adapted to be operatively connected by a flexible belt and said second drive and driven members being adapted to be frictionally engaged, and control levers for selectively pivoting said sleeve members and thereby selectively rotating said first and second brackets on said support member to move said rotatable shaft toward and away from said stub shafts to selectively operatively engage one or both of said pairs of drive and driven members.

5. A track-laying tractor as in claim 4 wherein each of said second drive members comprises an adjustable V-groove pulley and each of said second driven members comprises a friction disc adapted to engage said V-groove pulley and be driven thereby.

6. A track-laying tractor as in claim 4 including over-center brake means for selectively engaging a friction disc.

References Cited by the Examiner
UNITED STATES PATENTS

| | | | |
|---|---|---|---|
| 842,260 | 1/1907 | Sheer | 74—203 |
| 1,862,784 | 6/1932 | Choate | 305—13 |
| 1,932,108 | 10/1933 | Johnston et al. | 180—6.7 |
| 2,074,319 | 3/1937 | Baker et al. | 180—6.7 |
| 2,595,229 | 5/1952 | Curtis | 180—6.66 X |
| 2,604,747 | 7/1952 | Bash | 180—6.66 |
| 2,618,516 | 11/1952 | Smith | 305—13 |
| 2,626,671 | 1/1953 | Hardy et al. | 180—6.2 |
| 2,918,133 | 12/1959 | Ericsson | 180—19 |

BENJAMIN HERSH, *Primary Examiner.*

A. HARRY LEVY, *Examiner.*